(12) United States Patent
Foreman

(10) Patent No.: US 12,461,221 B2
(45) Date of Patent: Nov. 4, 2025

(54) MULTI-SIGNAL RADAR CROSS-TALK MITIGATION

(71) Applicant: Terry Lee Foreman, Colonial Beach, VA (US)

(72) Inventor: Terry Lee Foreman, Colonial Beach, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 377 days.

(21) Appl. No.: 18/082,652

(22) Filed: Dec. 16, 2022

(65) Prior Publication Data

US 2023/0127565 A1  Apr. 27, 2023
US 2023/0236305 A1  Jul. 27, 2023

Related U.S. Application Data

(63) Continuation-in-part of application No. 18/071,774, filed on Nov. 30, 2022, now Pat. No. 12,320,923,
(Continued)

(51) Int. Cl.
   *G01S 13/524*  (2006.01)
   *G01S 7/02*    (2006.01)

(52) U.S. Cl.
   CPC ........ *G01S 13/5244* (2013.01); *G01S 7/0235* (2021.05)

(58) Field of Classification Search
   None
   See application file for complete search history.

(56) References Cited

U.S. PATENT DOCUMENTS

| 6,252,540 B1 | 6/2001 | Hale et al. ............... 342/159 |
| 7,236,124 B2 * | 6/2007 | Adams ................ G01S 7/414 342/162 |

(Continued)

FOREIGN PATENT DOCUMENTS

| CN | 111337895 A * | 6/2020 | ............ G01S 7/36 |
| WO | WO-2017051209 A1 * | 3/2017 | |

OTHER PUBLICATIONS

E. Conte et al. "Statistical Analysis of Real Clutter at Different Range Resolutions" *IEEE Trans Aeros & Electr. Sys:* 40(3), 2004. https://ieeexplore.ieee.org/stamp/stamp.jsp?tp=&arnumber=1337463.

(Continued)

*Primary Examiner* — William Kelleher
(74) *Attorney, Agent, or Firm* — Gerhard W. Thielman

(57) ABSTRACT

A computer-implemented method is provided for identifying a target amid clutter and minimize cross-talk from receive signals returned therefrom via a Multiple Input Multiple Output (MIMO) radar system that emits transmit signals into a resolution cell that contains the target and the clutter. The method includes employing a match filter to estimate a set of parameters from each receive signal of the receive signals; determining interference correlation; estimating clutter correlation; forming an optimum detector with the estimated correlation for each receive signal among the receive signals; employing the optimum detector to estimate the target set of parameters from each receive signal as an estimated target parameter; returning to the forming operation in response to the estimated target parameter exceeding an established tolerance; and applying the estimated target parameter to the receive signals for submission to the MIMO radar system.

7 Claims, 4 Drawing Sheets

Related U.S. Application Data which is a continuation-in-part of application No. 16/916,525, filed on Jun. 30, 2020, now Pat. No. 11,733,351.

(56) References Cited

U.S. PATENT DOCUMENTS

| | | | |
|---|---|---|---|
| 9,194,947 B1 * | 11/2015 | Mohamed | G01S 13/28 |
| 9,857,455 B2 | 1/2018 | Foreman | G01S 7/4008 |
| 2006/0273951 A1 | 12/2006 | Adams et al. | G01S 13/273 |
| 2012/0320363 A1 | 12/2012 | Goodman | G01C 3/08 |
| 2017/0023664 A1 * | 1/2017 | Foreman | G01S 7/2925 |
| 2017/0338874 A1 * | 11/2017 | Pratt | H04B 7/0862 |
| 2019/0190634 A1 * | 6/2019 | Tiwari | H04L 5/00 |
| 2021/0223385 A1 | 7/2021 | Breton et al. | G01S 7/414 |
| 2022/0091232 A1 | 3/2022 | Foreman | G01S 7/414 |

OTHER PUBLICATIONS

M. S. Davis et al. "Coherent MIMO Radar: The Phased Array and Orthogonal Waveforms" *IEEE Aeros. & Electr. Sys. Mag.* 29(8), 2014. https://ieeexplore.ieee.org/stamp/stamp.jsp?tp=&arnumber=7059620.

T. L. Foreman "Adapting the CLEAN Deconvolver and CLEAN Detector to Doppler Uncertainty" IEEE Radar Conference 2007. https://ieeexplore.ieee.org/stamp/stamp.jsp?tp=&arnumber=4250330.

E. J. Holder, *Angle-of-Arrival Estimation Using Radar Interferometry*, SciTech Pub., Edison NJ 2014, §6.3 (pp. 111-113).

\* cited by examiner

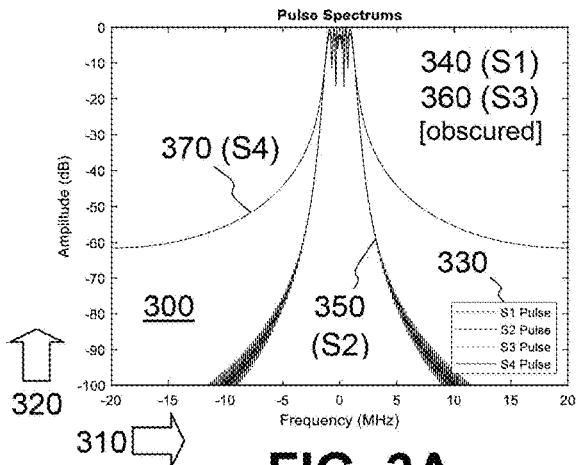
FIG. 3A
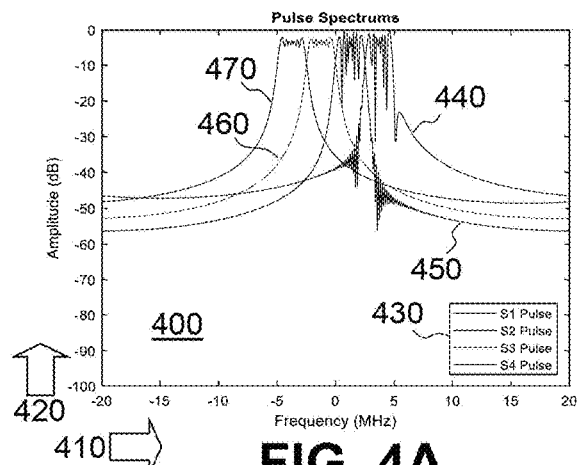
FIG. 4A
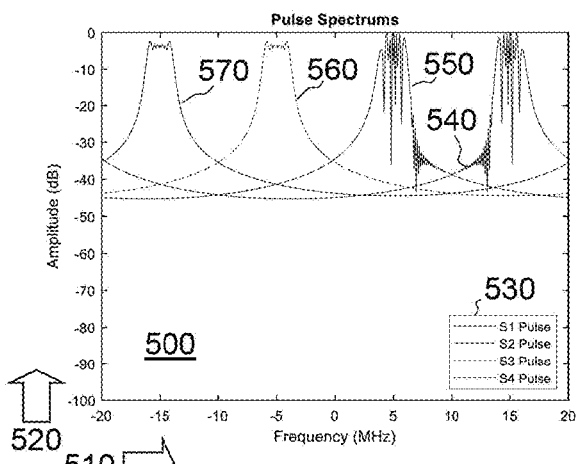
FIG. 5A
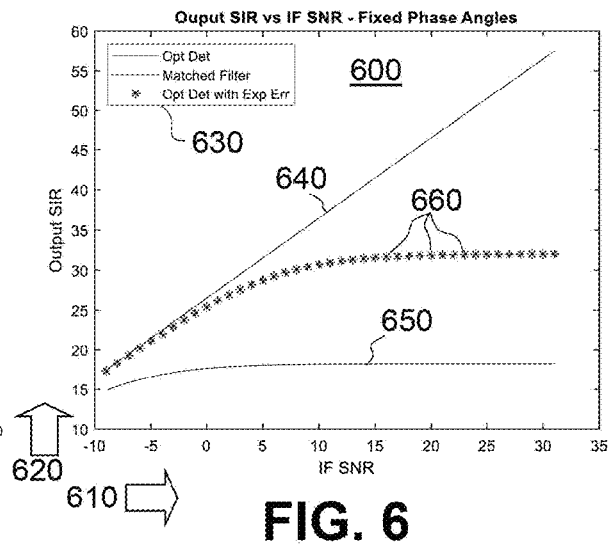
FIG. 6
Table I Case I (Overlapping Spectrum) Waveform Parameters
| Signal 380 | Modulation | Pulse Width | Time Bandwidth Product | Center Frequency |
|---|---|---|---|---|
| $s^1$ | Down/Up Chirp | 11.25 μsec | 28.125 | 0 MHz |
| $s^2$ | Up/Down Chirp | 11.25 μsec | 28.125 | 0 MHz |
| $s^3$ | Up Chirp | 11.25 μsec | 28.125 | 0 MHz |
| $s^4$ | Down Chirp | 11.25 μsec | 28.125 | 0 MHz |
FIG. 3B

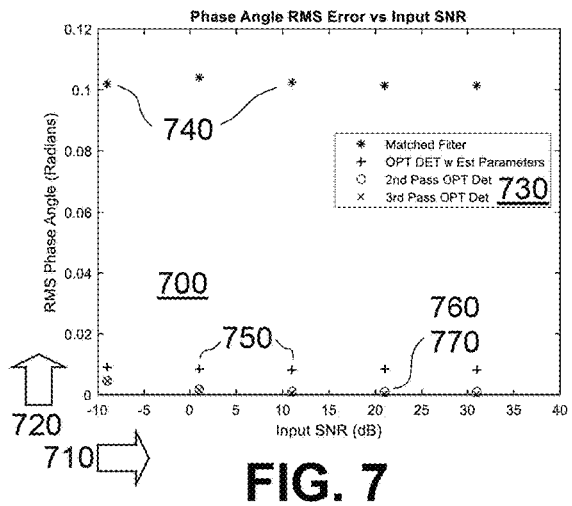
FIG. 7
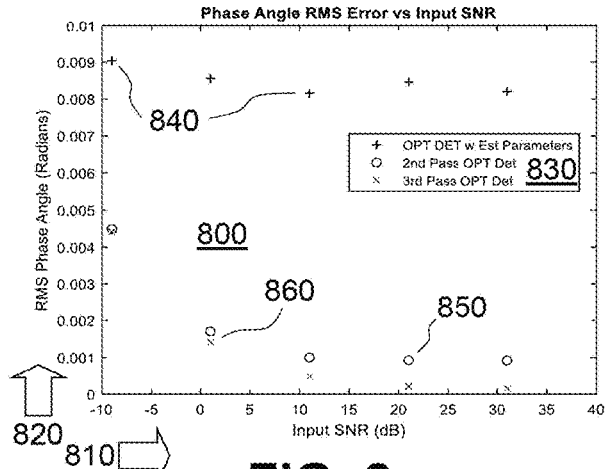
FIG. 8
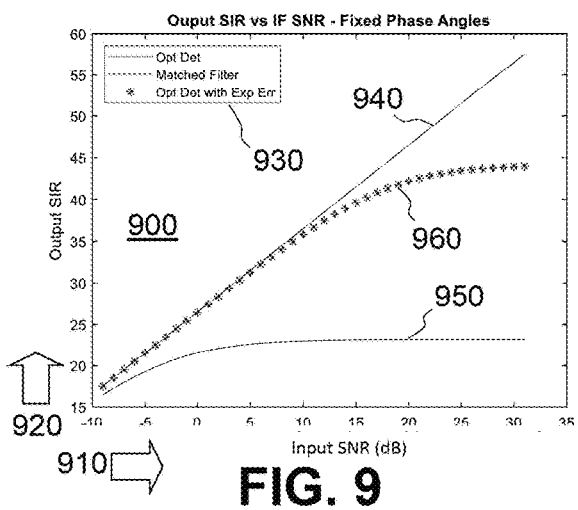
FIG. 9
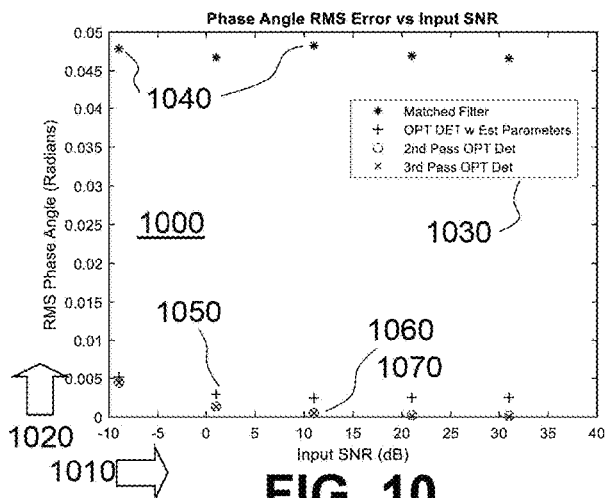
FIG. 10
Table III Case II (Non-Overlapping Spectrum) Waveform Parameters
| Signal 480 | Modulation | Pulse Width | Time Bandwidth Product | Center Frequency |
|---|---|---|---|---|
| $s^1$ | Down/Up Chirp | 11.25 μsec | 28.125 | 2.75 MHz |
| $s^2$ | Up/Down Chirp | 11.25 μsec | 28.125 | 1.25 MHz |
| $s^3$ | Up Chirp | 11.25 μsec | 28.125 | −1.25 MHz |
| $s^4$ | Down Chirp | 11.25 μsec | 28.125 | −2.75 MHz |
FIG. 4B

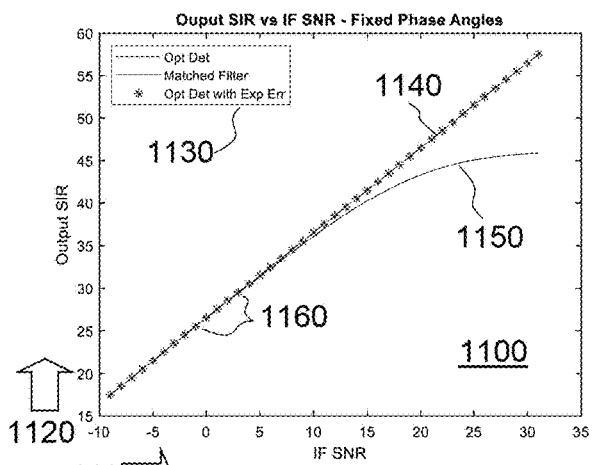

FIG. 11

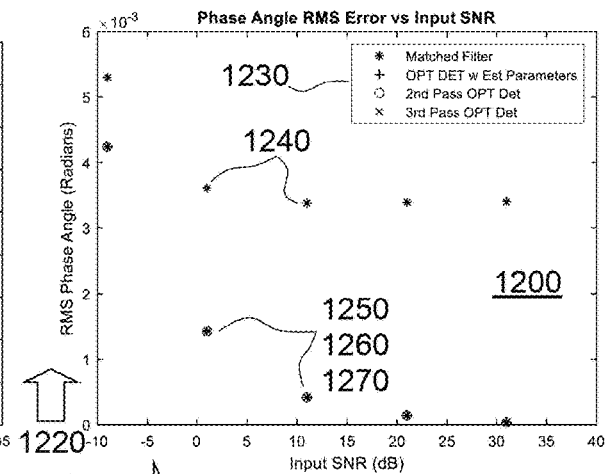

FIG. 12

Table V Case III (Widely Spaced Spectrum) Waveform Parameters

| Signal 580 | Modulation | Pulse Width | Time Bandwidth Product | Center Frequency |
|---|---|---|---|---|
| $s^1$ | Down/Up Chirp | 11.25 μsec | 28.125 | 5 MHz |
| $s^2$ | Up/Down Chirp | 11.25 μsec | 28.125 | 10 MHz |
| $s^3$ | Up Chirp | 11.25 μsec | 28.125 | −5 MHz |
| $s^4$ | Down Chirp | 11.25 μsec | 28.125 | −10 MHz |

FIG. 5B

Table II Case I Signal Correlations

| Signals 390 | Correlation Coefficient | Correlation Coefficient (dB) |
|---|---|---|
| $S^1 S^2$ | 0.1463 | -8.4 |
| $S^1 S^3$ | 0.0452 | -13.4 |
| $S^1 S^4$ | 0.0452 | -13.4 |
| $S^2 S^3$ | 0.0452 | -13.4 |
| $S^2 S^4$ | 0.0452 | -13.4 |
| $S^3 S^4$ | 0.1274 | -8.9 |

FIG. 3C

Table IV Case II Signal Correlations

| Signals 490 | Correlation Coefficient | Correlation Coefficient (dB) |
|---|---|---|
| $S^1 S^2$ | 0.0687 | -11.3 |
| $S^1 S^3$ | 0.0038 | -24.2 |
| $S^1 S^4$ | 0.0031 | -25.1 |
| $S^2 S^3$ | 0.0550 | -12.6 |
| $S^2 S^4$ | 0.0059 | -22.3 |
| $S^3 S^4$ | 0.0664 | -11.8 |

FIG. 4C

Table VI Case III Signal Correlations

| Signals 590 | Correlation Coefficient | Correlation Coefficient (dB) |
|---|---|---|
| $S^1 S^2$ | 0.0027 | -25.7 |
| $S^1 S^3$ | 2.2100e-04 | -36.6 |
| $S^1 S^4$ | 0.0036 | -24.4 |
| $S^2 S^3$ | 0.0036 | -24.4 |
| $S^2 S^4$ | 2.2100e-04 | -36.6 |
| $S^3 S^4$ | 0.0033 | -24.8 |

MULTI-SIGNAL RADAR CROSS-TALK MITIGATION

CROSS REFERENCE TO RELATED APPLICATION

The invention is a Continuation-in-Part, claims priority to and incorporates by reference in its entirety U.S. patent application Ser. No. 18/071,774 filed Nov. 30, 2022 and assigned Navy Case 211025, which in turn claims priority to and incorporates by reference U.S. patent application Ser. No. 16/916,525 filed Jun. 30, 2020 and assigned Navy Case 113045.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to radar signal processing. In particular, the invention relates to minimizing cross-talk among array radars with multiple transmitters and receivers.

SUMMARY

Conventional radar signal filtering techniques yield disadvantages addressed by various exemplary embodiments of the present invention. In particular, various exemplary embodiments provide a computer-implemented method for identifying a target amid clutter and minimize cross-talk from receive signals returned therefrom via a Multiple Input Multiple Output (MIMO) radar system that emits transmit signals into a resolution cell that contains the target and the clutter. The method includes employing a match filter to estimate a set of parameters from each receive signal of the receive signals; determining interference correlation; estimating clutter correlation; forming an optimum detector with the estimated correlation for each receive signal among the receive signals; employing said optimum detector to estimate the target set of parameters from each receive signal as an estimated target parameter; returning to the forming operation in response to the estimated target parameter exceeding an established tolerance; and applying the estimated target parameter to the receive signals for submission to the MIMO radar system. Other various embodiments alternatively or additionally provide for the target parameter being output power.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 3A is a graphical view of a pulse spectrum for Case I;
FIG. 3B is a tabular view of waveform parameters for Case I;
FIG. 3C is a tabular view of signal correlations for Case I;
FIG. 4A is a graphical view of a pulse spectrum for Case II;
FIG. 4B is a tabular view of waveform parameters for Case II;
FIG. 4C is a tabular view of signal correlations for Case II;
FIG. 5A is a graphical view of a pulse spectrum for Case III;
FIG. 5B is a tabular view of waveform parameters Case III;
FIG. 5C is a tabular view of signal correlations for Case III;
FIG. 6 is a graphical view of output signal-interference ratio (SIR) comparison for Case I;
FIG. 7 is a graphical view of phase angle error to signal-to-noise ratio (SNR) for Case I;
FIG. 8 is a graphical detail view of angle error to SNR for Case I;
FIG. 9 is a graphical view of output SIR for Case II;
FIG. 10 is graphical detail view of angle error to SNR for Case II;
FIG. 11 is graphical view of output SIR for Case III;
and
FIG. 12 is a graphical detail view of angle error to SNR for Case III.

DETAILED DESCRIPTION

Figure 1:
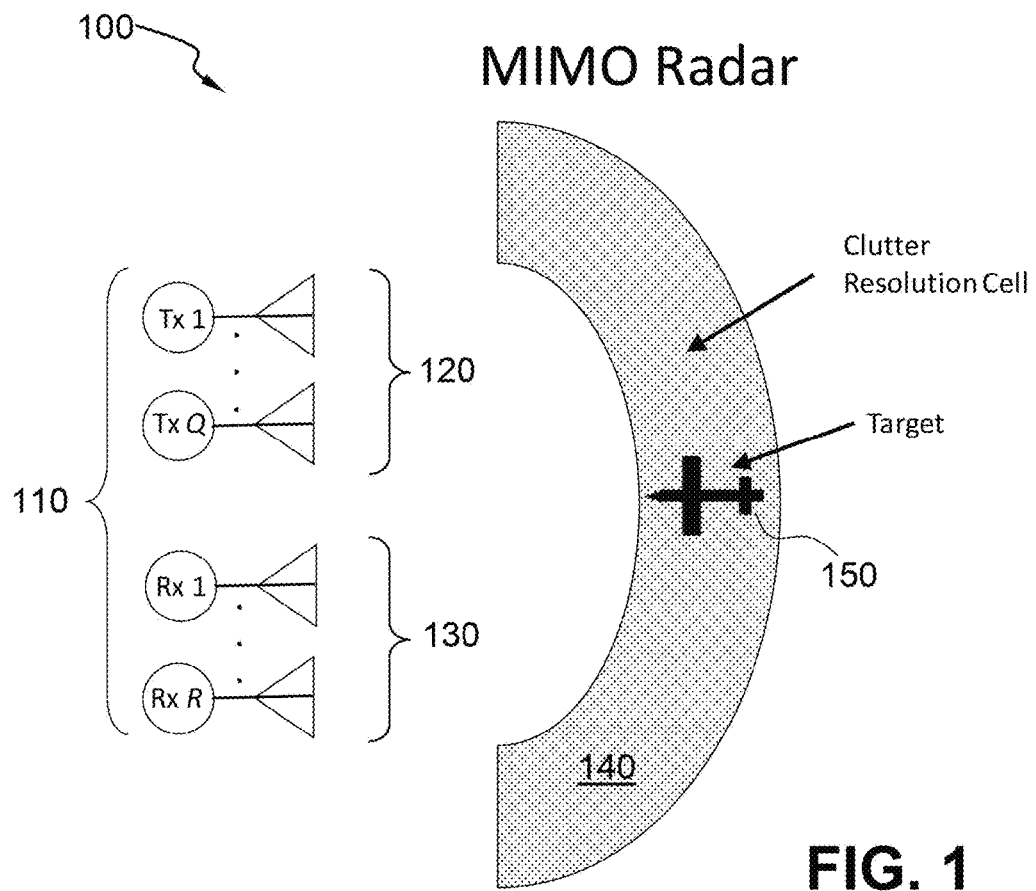
FIG. 1 is a block diagram view of a MIMO radar system.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

The disclosure generally employs quantity units with the following abbreviations: length in meters (m), mass in grams (g), time in seconds (s), angles in degrees (°) or radians, force in newtons (N), temperature in kelvins (K), energy in joules (J), signal strength in decibels (dB) and frequencies in gigahertz (GHz). Supplemental measures can be derived from these, such as density in grams-per-cubic-centimeters (g/cm$^3$), moment of inertia in gram-square-centimeters (kg-m$^2$) and the like.

Section 1: Multiple Input Multiple Output (MIMO) Radar is an approach to radar design that gives the radar designer additional degrees of freedom to achieve a number of design goals. This is accomplished by dividing the transmit antenna into multiple antennas. Each of these antennas transmits a distinct orthogonal signal. Additionally, there are multiple receive antennas, each receiving all the orthogonal transmitted signals. In each receive channel (behind each receive antenna) the multiple transmitted signals are separated by matched filtering for each transmitted signal.

A review of MIMO Radar is available from M. S. Davis, G. A. Showman, A. D. Lanterman, "Coherent MIMO Radar: The Phased Array and Orthogonal Waveforms", *IEEE Aerospace and Electronic Systems Magazine*, August 2014, pp. 76-91. This disclosure addresses the problem of imperfect orthogonality of the signal set and its impact on deriving information about the target. Signal processing developed here provides a mitigation strategy by directly taking into account the cross talk.

It is impossible to design signals that have complete orthogonality. Therefore, there will be cross-talk generated in the matched filter processing that is an inherent part of MIMO. The cross-talk can be viewed as interference. The approach taken in this disclosure is to form whitening matched filters that include the cross-talk as a source of interference. These filters are optimal under the assumption that the target amplitude and phase are known. Of course, the target amplitude and phase are the parameters to be measured, and hence are unknown.

However, because the problem of cross-talk will be more pronounced at high signal-to-noise ratios (SNR) the target phase and amplitude can be estimated and applied to these filters. This disclosure explains this as a viable approach to improving radar performance. Additionally, one of the approaches that radar designers use to increase orthogonality of waveforms is to spread them out in frequency, thus reducing signal cross-talk. Unfortunately, this frequency spreading increases spectrum occupancy. By applying the exemplary process developed herein, performance can be achieved with reduced spectrum occupancy.

Section 2—Overview: FIG. 1 shows a schematic view 100 of MIMO Radar system 110 with plural transmit antennas 120 and plural receive antennas 130. Each transmit antenna 120 emits an independent signal that project within an arc region called a clutter resolution cell 140 to detect and identify a target 150. Radar reflections from the target 150 are received by the receive antennas 130 for exemplary analysis. There are counted as Q transmit antennas 120 and R receive antennas 130.

View 100 quantifies the system 110 as having Q transmitting antennas 120 each transmitting a distinct signal associated with R receive antennas 130 that each receive the reflected signals from each transmit antenna 120. The transmit signals are separated in subsequent processing for each receive antenna 130 by matched filtering. J. C. Bancroft provides an "Introduction to matched filters", *CREWES Research Report* 14 (2002, at https://www.crewes.org/Documents/ResearchReports/2002/2002-46.pdf). This produces Q×R signals that can be processed (see Davis) to achieve beamforming or spatial measurement functions.

The goal of the exemplary signal processing developed herein is to improve the performance of the matched filter. Each transmit antenna 120 illuminates the target 150. Similarly, each receive antenna 130 receives the backscatter from the illuminated target 150. Note that the width of the resolution cell 140 is determined by the beamwidth of the individual antenna's beamwidth (not the full array beamwidth). The range depth of the resolution cell 140 is determined by the range resolution of the waveform (i.e., bandwidth).

The signal model for receive antenna r and a particular transmit antenna q' due to the target 150 is:

$$y_t^{r,q'}(t) = a_r b_q \alpha s^{q'}(t - t_r), \quad (1)$$

where $s^{q'}(t)$ is the baseband signal transmitted by the q' antenna, $t_r$ is the range induced time delay of the target 150, $\alpha$ is the complex amplitude of the target 150, $b_{q'}$ is the phase shift corresponding to the target angle relative to transmit antenna q', $a_r$ is the phase shift corresponding to the target angle relative to receive antenna r.

In vector notation, this signal model produces model vector:

$$y_t^{r,q'} = a_r b_q \alpha \tilde{S}^{q'} \delta_k, \quad (2)$$

where $\delta_k$ is a vector is size $(P+2(N-1)) \times 1$ with all zeros except the $k^{th}$ element being one (indicating target location), and $\tilde{S}^{q'}$ is the convolution matrix for the q' signal calculated as:

$$\tilde{S}^{q'} = \begin{bmatrix} 0 & \cdots & 0 & (s^{q'})^t \\ 0 & \cdots & (s^{q'})^t & 0 \\ & \ddots & & \\ (s^{q'})^t & 0 & \cdots & 0 \end{bmatrix}. \quad (3)$$

Note that $s^{q'}$ is the vector of baseband samples of $s^{q'}(t)$ of length N, and the superscript t indicates transpose. The size of the convolution matrix $\tilde{S}^{q'}$ is $(P+N-1) \times (P+2(N-1))$, where P is the number of uneclipsed samples in the received interval.

The target model in eqn. (2) is adequate for stationary targets or targets whose Doppler can be ignored. In most cases the target Doppler must be accounted for. Target Doppler manifests itself in the receive data as a phase change from sample to sample. The approach to account for Doppler used herein follows T. L. Foreman, "Adapting the CLEAN Deconvolver and CLEAN Detector to Doppler Uncertainty," *IEEE Radar Conference*, 2007, eqn. (5), thus the target model is expressed as follows:

$$y_t^{r,q'} = a_r b_q \alpha \tilde{S}_d^{q'}(m) \delta_k, \quad (4)$$

where m is the pulse number that becomes relevant in the § 2.

Further, the convolution matrix is written as:

$$\tilde{S}_d^{q'}(m) = \begin{bmatrix} 0 & \cdots & s_1^{q'} & s_2^{q'} e^{j\phi(m,1)} & \cdots & s_N^{q'} e^{j\phi(m,N-1)} \\ & & & \vdots & & \\ s_1^{q'} & s_2^{q'} e^{j\phi(m,1)} & \cdots & s_N^{q'} e^{j\phi(m,N-1)} & \cdots & 0 \end{bmatrix}, \quad (5)$$

where $s^{q'}$ are the elements of $s^{q'}$, and $$\phi(m, n) = \frac{4\pi(R(mT_i + nT_s) - R(mT_i))}{\lambda}, \quad (6)$$

where R(t) is the target's range as a function of time, $\lambda$ is the carrier wavelength, $T_s$ is the sample time, and $T_i$ is the time between transmission of radar pulses. Note that m=0, ... M−1, with M being the number of pulses. Thus, for a single pulse radar m=0.

Next, the interference signal is determined in order to calculate the interference correlation matrix. In this case the sources of interference are clutter, the signals from other transmit antennas, and receiver noise (assumed to be additive white Gaussian Noise (AWGN)). Under these assumptions the interference represented in the receive data to be input into the $q'^{th}$ filter is:

$$y_t^{r,q'}(m) = \sum_{q=1}^{Q} \tilde{S}^q c^q + a_r \sum_{n=q'} b_{q'} \alpha \tilde{S}_d^q(m) \delta_k + n, \quad (7)$$

where $c^q$ is the vector of clutter voltages illuminated by the $q'^{th}$ antenna and n is the AWGN vector. When one invokes the assumptions that vectors $c^q$ and n are zero mean and uncorrelated, the correlation matrix is determined as:

$$R_I^{q'} = E\{y_I^r(y_I^r)^H\} = \sum_{q=1}^{Q}\sum_{\lambda=1}^{Q} \tilde{S}^q E\{c^q(c^\lambda)^H\}(\tilde{S}^\lambda)^H + \ldots$$
$$|a_r|^2 |\alpha|^2 \sum_{q \neq q'} \sum_{\lambda \neq q'} b_q b_\lambda^* \tilde{S}_d^q(m) \delta_k \delta_k^H \left(\tilde{S}_d^q(m)\right)^H + \sigma_n^2 I, \quad (8)$$

where superscript H denotes the Hermitian of that matrix and I is an identity matrix indicating that the receiver noise is uncorrelated.

The clutter in eqn. (8) will be addressed first. The correlation of vector c is matrix $R_c$, defined as:

$$R_c = E\{cc^H\} = \begin{bmatrix} \sigma_1^2 & & 0 \\ & \ddots & \\ 0 & & \sigma_{P+2(N-1)}^2 \end{bmatrix}, \quad (9)$$

where $\sigma_i^2$ is the variance or power of the clutter at range cell i. The clutter is assumed to be spatially white, meaning that range cells are uncorrelated. The clutter cross terms (i.e., $q \neq \lambda$) in eqn. (8) need some consideration. This approach to MIMO clutter is described in application Ser. No. 18/071,774. First the signals transmitted are desired to be orthogonal or uncorrelated thus for $q \neq \lambda$, $\tilde{S}^q(\tilde{S}^\lambda)^H \approx [0]$ Next, the clutter resolution cell 140 will generally be large in the angle (cross range) dimension. Because of that, the clutter resolution cells 140 consist of many individual scatters with different phases. The observations at the receive antenna 130 are the summation of these scatterers with random phase between the same scatterer as the clutter is illuminated by different transmit antennas 120. The net effect of this produces clutter expectation E as:

$$E\{c^q(c^\lambda)^H\} \approx [0]. \quad (10)$$

Therefore, the assumption that near zero convolution $\tilde{S}^q E\{c^q (c^\lambda)^H\}(\tilde{S}^\lambda)^H \approx [0]$ is well justified.

Based on this reasoning the interference matrix becomes:

$$R_I^{q'} = \sum_{q=1}^{Q} \tilde{S}^q R_c (\tilde{S}^q)^H + |\alpha|^2 \sum_{q \neq q'} \sum_{\lambda \neq q'} b_q b_\lambda^* \tilde{S}_d^q(m) \delta_k \delta_k^H \left(\tilde{S}_d^q(m)\right)^H + \sigma_n^2 I. \quad (11)$$

Next the signal and interference models will be extended for the case that the radar transmits multiple coherent pulses to make its detection decision. The receiver response to the target 150 is determined first. Under the slow-moving target assumption (i.e., no range migration), the target response is identical from pulse-to-pulse except for the phase change imparted due to the target's motion from pulse-to-pulse.

Thus, the receiver response to the target 150 can be represented as stacked vector:

$$Y_t^{q'} = a_r b_{q'} \alpha \begin{bmatrix} u_0 \tilde{S}_d^{q'}(0) \delta_k \\ \vdots \\ u_{M-1} \tilde{S}_d^{q'}(M-1) \delta_k \end{bmatrix}, \quad (12)$$

where M is the number of pulses, $u_i$ accounts for the phase change from pulse-to-pulse and is computed as:

$$u_i = \exp\left(j4\pi \frac{R(iT_i)}{\lambda}\right), \quad (13)$$

and $\lambda$ is the wavelength and $T_i$ is the pulse repetition interval (PRI).

The phase change is proportional to the range change as a function of time and is generally ascribed to the Doppler effect. For the case of a nonaccelerating target (where $\tilde{S}_d$ is independent of pulse number), the Kronecker product $\otimes$ permits eqn. (12) to be written compactly as:

$$Y_t^{q'} = u \otimes S_d^{q'} \delta_k, \quad (14)$$

where u is a column vector whose elements are defined in eqn. (13).

The array size of pulse-to-pulse phase change column vector u is M×1, where M is the number of pulses (see P. Lancaster and M. Tismenetsky, *The Theory of Matrices*, 2e with applications, San Diego: Academic Press, 1985, § 12.1, pp. 406-407). Therefore, the size of stacked vector $Y_t^{q'}$ is size M(N+P−1)×1. For the case of fast moving targets that experience range migration, see T. L. Foreman, "Derivation of Optimum Detector for Range Migrating Targets In The Presence Of Clutter", NSWCDD/TR-20/167, April 2020 for a technique to modify the target model.

Next, the interference model will be extended to the case of multiple pulses. The assumption of clutter being a compound Gaussian process is now invoked. This assumption has been verified by E. Conte, A. De Maio, C. Galdi, "Statistical Analysis of Real Clutter at Different Range Resolutions", *IEEE Transactions on Aerospace and Electronic Systems* 40(3) July 2004, pp. 903-918. The compound Gaussian model states that the clutter voltage at any range cell i at time r is defined as:

$$c_i(t) = \sigma_i g_i(t), \quad (15)$$

where $\sigma_i$ is a random variable equal to the square root of the power variance at range cell i, and $g_i(t)$ is a unity variance complex Gaussian process that accounts for the pulse-to-pulse variance of the clutter complex amplitude.

The time correlation function of the clutter is an expectation function:

$$R_g^i(\tau) = E\{g_i(t+\tau)g_i^*(t)\}, \quad (16)$$

which defines the clutter spectral characteristics. The autocorrelation of a random process and its power spectral density form a Fourier transform pair. The process $\sigma_i$ is often called the texture, and $g_i(t)$ is called the speckle. This model accounts for the significant changes of clutter amplitude from range cell to range cell as well as the Doppler spectrum properties of the clutter. The clutter Doppler spectrum then is the Fourier transform of the time-correlation function.

Assuming the clutter is compound Gaussian and the clutter variance is known, then the resulting clutter distribution is Gaussian. In other words, for a known cell variance $\sigma_i^2$ (through online measurement and estimation or through clutter modeling), clutter correlation $R_c$ in eqn. (9) is thereby known. This in turn means the interference process as perceived by the radar receiver in signal model $y_t$ represents a Gaussian random process whose correlation matrix is determined in eqn. (16) above.

Next, the pulse-to-pulse clutter is determined. Using the compound Gaussian model, the time correlation function is designated $R_g(\tau)$ defined in eqn. (16). Assuming that the clutter over the whole range extent is the same type (e.g., sea clutter), then one can reasonably expect that function $R_g(\tau)$ is the same for every range cell. This means that for every range cell i, there is a random draw of the random variable $\sigma_i$ that determines its variance (power), as well as a random draw of the stationary random process g(t) that has zero mean unity variance complex Gaussian correlated in time according to function $R_g(\tau)$. Note that the random and independent initial phase of the clutter voltage is uncorrelated from range cell to range cell as previously discussed.

Under these assumptions, one can define c(t) as the column vector of the clutter amplitudes at slow time t. One should note that clutter vector c(t) is a complex random process. Now one can write the stacked vector representing the response of the receiver 130 due to clutter as:

$$Y_c = \sum_{q=1}^{Q} \begin{bmatrix} \tilde{S}^q c^q(0) \\ \tilde{S}^q c^q((i-1)T_i) \\ \vdots \\ \tilde{S}^q c^q((M-1)T_i) \end{bmatrix}. \quad (17)$$

The clutter correlation matrix for the stacked vector $Y_c$ is determined as an expectation:

$$R_{Y_c} = \\ E\{Y_c Y_c^H\} = \sum_{q=1}^{Q} E\left\{ \begin{bmatrix} \tilde{S}^q c(0)c^H(0)(\tilde{S}^q)^H & \cdots & \tilde{S}^q c(0)c^H((M-1)T)(\tilde{S}^q)^H \\ & \ddots & \\ \tilde{S}^q c((M-1)T_i)c^H(0)(\tilde{S}^q)^H & \cdots & \tilde{S}^q c((M-1)T_i)c^H((M-1)T)(\tilde{S}^q)^H \end{bmatrix} \right\}. \quad (18)$$

This correlation can be rewritten to isolate convolution matrix $\tilde{S}^q$ as:

$$R_{Y_c} = \sum_{q=1}^{Q} \begin{bmatrix} \tilde{S}^q E\{c(0)c^H(0)(\tilde{S}^q)^H\} & \cdots & \tilde{S}^q E\{c(0)c^H((M-1)T)(\tilde{S}^q)^H\} \\ & \ddots & \\ \tilde{S}^q E\{c((M-1)T_i)c^H(0)(\tilde{S}^q)^H\} & \cdots & \tilde{S}^q E\{c((M-1)T_i)c^H((M-1)T)(\tilde{S}^q)^H\} \end{bmatrix}. \quad (19)$$

Each expectation in (19) can be represented as:

$$E\{c^q(jT_i)c^H(kT_i)\}(\tilde{S}^\lambda)^H \approx \\ \begin{bmatrix} \sigma_1^2 R_g^1((j-k)T_i) & 0 \\ & \ddots & \\ 0 & \sigma_{P+2(N-1)}^2 R_g^{P+2(N-1)}((j-k)T_i) \end{bmatrix} \quad (20)$$

The result in eqn. (20) is obtained by applying eqn. (9) and invoking the assumption that the clutter is zero mean and uncorrelated cell-to-cell.

Under the assumption that the clutter has the same Doppler spectrum in each cell, this can be further simplified as in eqn. (14). In that circumstance, define correlation element:

$$\rho_{j,k} = R_g((j-k)T_i). \quad (21)$$

This enables eqn. (19) to be written as:

$$R_{Y_c} = \\ \sum_{q=1}^{Q} \begin{bmatrix} \rho_{1,1} \tilde{S}^q R_c(\tilde{S}^q)^H & \cdots & \rho_{1,M} \tilde{S}^q R_c(\tilde{S}^q)^H \\ & \ddots & \\ \rho_{M,1} \tilde{S}^q R_c(\tilde{S}^q)^H & \cdots & \rho_{M,M} \tilde{S}^q R_c(\tilde{S}^q)^H \end{bmatrix} = \sum_{q=1}^{Q} M_c \otimes \tilde{S}^q R_c(\tilde{S}^q)^H, \quad (22)$$

where the clutter time correlation matrix is:

$$M_c = \begin{bmatrix} \rho_{1,1} & & \rho_{1,M} \\ & \ddots & \\ \rho_{M,1} & & \rho_{M,M} \end{bmatrix}. \quad (23)$$

Remember that correlation $R_c$ is diagonal because clutter is uncorrelated from range cell to range cell.

Next the correlation matrix for the cross-talk will be determined. The contribution of cross-talk to the received signal for pulse m is:

$$y_{CT}(m) = a_r \alpha \sum_{q \neq q'} b_q \tilde{S}_d^q(m) \delta_m. \quad (24)$$

Stacking the vectors produces the full vector $Y_{CT}$ of all the pulses as:

$$Y_{CT} = \begin{bmatrix} u_0 a_r \alpha \sum_{q \neq q'} b_q \tilde{S}_d^q(0) \delta_m \\ \vdots \\ u_{M-1} a_r \alpha \sum_{q \neq q'} b_q \tilde{S}_d^q(M-1) \delta_m \end{bmatrix}. \quad (25)$$

The correlation matrix for the cross-talk term is determined as:

$$R_{Y_{CT}}^{q'} = Y_{CT}Y_{CT}^{H} = \begin{bmatrix} \beta_{0,0} & \cdots & \beta_{0,M-1} \\ \vdots & \ddots & \vdots \\ \beta_{M-1,0} & \cdots & \beta_{M-1,M-} \end{bmatrix}, \quad (26)$$

where $$\beta_{j,k} = u_j u_k^* |a_r|^2 |\alpha|^2 \sum_{q \neq q'} \sum_{\lambda \neq q'} b_q b_\lambda^* \tilde{S}_d^q(j) \delta_k \delta_k^H \left(\tilde{S}_d^\lambda(k)\right)^H. \quad (27)$$

Finally, the noise part of the interference $Y_N$ for the multiple pulse is AWGN. Hence, the AWGN correlation matrix is:

$$R_N = E\{Y_N Y_N^H\} + \sigma_n^2 I, \quad (28)$$

where I is now the $M(N+P-1) \times M(N+P-1)$ identity matrix.

Noting, as previously stated, that the clutter and receiver noise are uncorrelated the interference matrix will be the sum of the individual interference matrices. Therefore, the correlation matrix for the interference process can be written as:

$$R_I^{q'} = R_{Y_c}^{q'} + R_{Y_{CT}}^{q'} + \sigma_n^2 I, \quad (29)$$

where $R_{Y_c}$ is defined in eqn. (22) and $R_{Y_{CT}}$ is defined in eqn. (26) above.

Based on the signal and interference models developed previously in § 2, it is possible to develop optimum detectors for MIMO radar 110 that include the clutter and signal cross-talk. Of course, this optimality is based on the knowledge of the clutter parameters and signal parameters. These parameters will likely not be known and will have to be estimated. The effect of estimating the clutter parameters is discussed in application Ser. No. 18/071,774. Estimating the signal parameters is described below.

The approach to deriving the optimum detector is taken from application Ser. No. 18/071,774 and T. L. Foreman, "Optimal Processing of Multiple-Pulse Radar Signals in Clutter," NSWCDD/TR-00/112, August 2000. When the clutter parameters are known, then the interference process is Gaussian. Therefore, a whitening matched filter will produce the highest signal to interference ratio of any filter. Further, a detector based on this whitening matched filter will have the highest probability of detection for a given probability of false alarm. This then is a Neyman-Pearson detector. For the single pulse case this detector for the q' transmitted signal is:

$$\left| \delta_k^H (\tilde{S}_d^{q'})^H \left(R_I^{q'}\right)^{-1} y \right| \overset{H_1}{\underset{H_0}{\gtrless}} \eta, \quad (30)$$

where interference correlation $R_I^{q'}$ is defined in eqn. (11) and $\eta$ is determined by the desired probability of false alarm. Similarly, the optimum detector for the multiple pulse case is determined as:

$$\left\| \begin{bmatrix} u_0 \tilde{S}_d^{q'}(0) \delta_t \\ \vdots \\ u_{M-1} \tilde{S}_d^{q'}(M-1) \delta_t \end{bmatrix} \left(R_I^{q'}\right)^{-1} Y \right\| \overset{H_1}{\underset{H_0}{\gtrless}} \eta. \quad (31)$$

Section 3: The matched filter is the standard processor for MIMO Radar (see Davis). The matched filter is the optimum detector when the interference source is additive white Gaussian noise (AWGN). Therefore, the performance comparisons of the signal processing proposed in this disclosure are made against the matched filter. In the notation used for this development, the matched filter for the single pulse, for the q' signal is written as:

$$\left| \delta_k^H (\tilde{S}_d^{q'})^H y \right| \overset{H_1}{\underset{H_0}{\gtrless}} \eta, \quad (32)$$

where $\eta$ is determined by the desired probability of false alarm.

In the notation used herein, the matched filter for multiple pulses, for the q' signal is written as:

$$\left\| \begin{bmatrix} u_0 \tilde{S}_d^{q'}(0) \delta_t \\ \vdots \\ u_{M-1} \tilde{S}_d^{q'}(M-1) \delta_t \end{bmatrix}^H Y \right\| \overset{H_1}{\underset{H_0}{\gtrless}} \eta. \quad (33)$$

where $\eta$ is determined by the desired probability of false alarm.

The relations to be used in the performance analysis will be derived. The first performance metric is the signal-to-interference ratio (SIR). To calculate the SIR, one begins with the filter equations to apply the signal and interference models to calculate the detector output. Applying the signal model of eqn. (4) to the detector of eqn. (30) produces the output $z_t$ of the filter due to the target on the $r^{th}$ receive antenna for signal q' as:

$$z_t = a_r b_q \alpha \delta_k^H (\tilde{S}_d^{q})^H (R_I^{q'})^{-1} S_d^{q'} \delta_k. \quad (34)$$

The power of the target response from the filter is:

$$|z_t|^2 = |\alpha|^2 |\delta_k^H (\tilde{S}_d^{q'})^H (R_I^{q'})^{-1} \tilde{S}_d^{q'} \delta_k|^2, \quad (35)$$

noting that $|a_r|^2 = |b_q|^2 = 1$.

Next the interference output of the single pulse is determined. Applying the filter to $y_I$, the interference part of the input produces:

$$z_I = \delta_k^H (\tilde{S}_d^{q'})^H (R_I^{q'})^{-1} y_I, \quad (36)$$

The expected value of the interference power coming out of the filter is:

$$E\{|z_I|^2\} = \delta_k^H (\tilde{S}_d^{q'})^H \left(R_I^{q'}\right)^{-1} E\{y_I y_I^H\} R_I^{-1} \tilde{S}_d^{q'} \delta_k \quad (37)$$
$$= \delta_k^H (\tilde{S}_d^{q'})^H \left(R_I^{q'}\right)^{-1} \tilde{S}_d^{q'} \delta_k$$

The SIR is the ratio of the signal power to the expected interference power. Using eqns. (35) and (37), single pulse SIR is calculated as:

$$SIR = \frac{|z_t|^2}{E\{|z_I|^2\}} = |\alpha|^2 \delta_k^H (\tilde{S}_d^{q'})^H \left(R_I^{q'}\right)^{-1} \tilde{S}_d^{q'} \delta_k. \quad (38)$$

Next the SIR for the multiple pulse case is determined. The output $z_t$ due to the target 150 from the q' transmit antenna 120 in the $r^{th}$ receive antenna 130 is:

$$z_t = \begin{bmatrix} u_0 \tilde{S}_d^{q'}(0)\delta_t \\ \vdots \\ u_{M-1} \tilde{S}_d^{q'}(M-1)\delta_t \end{bmatrix}^H \left(R_I^{q'}\right)^{-1} a_r b_{q'} \alpha \begin{bmatrix} u_0 \tilde{S}_d^{q'}(0)\delta_t \\ \vdots \\ u_{M-1} \tilde{S}_d^{q'}(M-1)\delta_t \end{bmatrix}. \quad (39)$$

The power output of the multiple pulse optimum detector from the target 150 is:

$$|z_t|^2 = |\alpha|^2 \left\| \begin{bmatrix} u_0 \tilde{S}_d^{q'}(0)\delta_t \\ \vdots \\ u_{M-1} \tilde{S}_d^{q'}(M-1)\delta_t \end{bmatrix}^H \left(R_I^{q'}\right)^{-1} \begin{bmatrix} u_0 \tilde{S}_d^{q'}(0)\delta_t \\ \vdots \\ u_{M-1} \tilde{S}_d^{q'}(M-1)\delta_t \end{bmatrix} \right\|^2. \quad (40)$$

The output $z_I$ of the optimum detector for the multiple pulse detector due to interference is:

$$z_I = \begin{bmatrix} u_0 \tilde{S}_d^{q'}(0)\delta_t \\ \vdots \\ u_{M-1} \tilde{S}_d^{q'}(M-1)\delta_t \end{bmatrix}^H \left(R_I^{q'}\right)^{-1} Y_I. \quad (41)$$

The expected value of target power exiting the filter for the multiple pulse detector is:

$$E\{|z_I|^2\} = \begin{bmatrix} u_0 \tilde{S}_d^{q'}(0)\delta_t \\ \vdots \\ u_{M-1} \tilde{S}_d^{q'}(M-1)\delta_t \end{bmatrix}^H \left(R_I^{q'}\right)^{-1} E\{Y_I Y_I^H\} \left(R_I^{q'}\right)^{-1} \begin{bmatrix} u_0 \tilde{S}_d^{q'}(0)\delta_t \\ \vdots \\ u_{M-1} \tilde{S}_d^{q'}(M-1)\delta_t \end{bmatrix}$$

$$= \begin{bmatrix} u_0 \tilde{S}_d^{q'}(0)\delta_t \\ \vdots \\ u_{M-1} \tilde{S}_d^{q'}(M-1)\delta_t \end{bmatrix}^H \left(R_I^{q'}\right)^{-1} \begin{bmatrix} u_0 \tilde{S}_d^{q'}(0)\delta_t \\ \vdots \\ u_{M-1} \tilde{S}_d^{q'}(M-1)\delta_t \end{bmatrix}. \quad (42)$$

Therefore, the SIR for the multiple pulse case is:

$$SIR = \quad (43)$$

$$\frac{|z_t|^2}{E\{|z_I|^2\}} = |\alpha|^2 \begin{bmatrix} u_0 \tilde{S}_d^{q'}(0)\delta_t \\ \vdots \\ u_{M-1} \tilde{S}_d^{q'}(M-1)\delta_t \end{bmatrix}^H \left(R_I^{q'}\right)^{-1} \begin{bmatrix} u_0 \tilde{S}_d^{q'}(0)\delta_t \\ \vdots \\ u_{M-1} \tilde{S}_d^{q'}(M-1)\delta_t \end{bmatrix}.$$

SIR for Matched Filter Detectors: The output $z_t$ of the matched filter due to the target 150 in the $r^{th}$ receive antenna 120 from the q' transmit antenna 110 is:

$$z_t = \delta_k^H (\tilde{S}_d^{q'})^H a_r b_{q'} \alpha \tilde{S}_d^{q'} \delta_k. \quad (44)$$

The power output due to the target 150 then is:

$$|z_t|^2 = |\alpha|^2 |\delta_k^H (\tilde{S}_d^{q'})^H \tilde{S}_d^{q'} \delta_k|^2. \quad (45)$$

The output $z_t$ exiting the filter for the matched filter detector due to interference is:

$$z_I = \delta_k^H (\tilde{S}_d^{q'})^H Y_I. \quad (46)$$

The expected value of the target power exiting from the matched filter detector is $$E\{|z_I|^2\} = \delta_k^H (\tilde{S}_d^{q'})^H \left(R_I^{q'}\right)^{-1} E\{y_I y_I^H\} R_I^{-1} \tilde{S}_d^{q'} \delta_k \quad (47)$$

$$= \delta_k^H (\tilde{S}_d^{q'})^H \left(R_I^{q'}\right)^{-1} \tilde{S}_d^{q'} \delta_k.$$

Therefore the single-pulse matched filter SIR is determined as:

$$SIR = \frac{|z_t|^2}{E\{|z_I|^2\}} = \frac{|\alpha|^2 |\delta_k^H (\tilde{S}_d^{q'})^H \tilde{S}_d^{q'} \delta_k|^2}{\delta_k^H (\tilde{S}_d^{q'})^H R_I^{q'} \tilde{S}_d^{q'} \delta_k}. \quad (48)$$

Next the SIR for matched filter with multiple pulses will be determined. The output $z_t$ of the matched filter multiple pulse detector due to the target 150 is:

$$z_t = a_r b_{q'} \alpha \begin{bmatrix} u_0 \tilde{S}_d^{q'}(0)\delta_t \\ \vdots \\ u_{M-1} \tilde{S}_d^{q'}(M-1)\delta_t \end{bmatrix}^H \begin{bmatrix} u_0 \tilde{S}_d^{q'}(0)\delta_t \\ \vdots \\ u_{M-1} \tilde{S}_d^{q'}(M-1)\delta_t \end{bmatrix}. \quad (49)$$

From eqn. (49), the voltage-squared output of the matched filter for the multiple pulse case is:

$$|z_t|^2 = |\alpha|^2 \left\| \begin{bmatrix} u_0 \tilde{S}_d^{q'}(0)\delta_t \\ \vdots \\ u_{M-1} \tilde{S}_d^{q'}(M-1)\delta_t \end{bmatrix}^H \begin{bmatrix} u_0 \tilde{S}_d^{q'}(0)\delta_t \\ \vdots \\ u_{M-1} \tilde{S}_d^{q'}(M-1)\delta_t \end{bmatrix} \right\|^2. \quad (50)$$

The output $z_I$ of the matched filter for multiple pulses due to interference is:

$$z_I = \begin{bmatrix} u_0 \tilde{S}_d^{q'}(0)\delta_t \\ \vdots \\ u_{M-1} \tilde{S}_d^{q'}(M-1)\delta_t \end{bmatrix}^H Y_I. \quad (51)$$

The expected value of the target power exiting of the matched filter multiple pulse detector is:

$$E\{|z_I|^2\} = \begin{bmatrix} u_0 \tilde{S}_d^{q'}(0)\delta_t \\ \vdots \\ u_{M-1} \tilde{S}_d^{q'}(M-1)\delta_t \end{bmatrix}^H E\{Y_I Y_I^H\} \begin{bmatrix} u_0 \tilde{S}_d^{q'}(0)\delta_t \\ \vdots \\ u_{M-1} \tilde{S}_d^{q'}(M-1)\delta_t \end{bmatrix} \quad (52)$$

$$= \begin{bmatrix} u_0 \tilde{S}_d^{q'}(0)\delta_t \\ \vdots \\ u_{M-1} \tilde{S}_d^{q'}(M-1)\delta_t \end{bmatrix}^H R_I^{q'} \begin{bmatrix} u_0 \tilde{S}_d^{q'}(0)\delta_t \\ \vdots \\ u_{M-1} \tilde{S}_d^{q'}(M-1)\delta_t \end{bmatrix}.$$

This enables the SIR for the multiple pulse matched filter to be determined as:

$$SIR = \frac{|z_t|^2}{E\{|z_t|^2\}} = |\alpha|^2 \frac{\begin{bmatrix} u_0 \tilde{S}_d^{q'}(0)\delta_t \\ \vdots \\ u_{M-1} \tilde{S}_d^{q'}(M-1)\delta_t \end{bmatrix}^H \begin{bmatrix} u_0 \tilde{S}_d^{q'}(0)\delta_t \\ \vdots \\ u_{M-1} \tilde{S}_d^{q'}(M-1)\delta_t \end{bmatrix}}{\begin{bmatrix} u_0 \tilde{S}_d^{q'}(0)\delta_t \\ \vdots \\ u_{M-1} \tilde{S}_d^{q'}(M-1)\delta_t \end{bmatrix}^H R_I^{q'} \begin{bmatrix} u_0 \tilde{S}_d^{q'}(0)\delta_t \\ \vdots \\ u_{M-1} \tilde{S}_d^{q'}(M-1)\delta_t \end{bmatrix}}. \quad (53)$$

SIR for Mismatched Detectors: The SIR for mismatched detectors will be calculated. Mismatched detectors are based on the optimum detectors using estimates of the target and clutter parameters. Because these detectors lack perfect knowledge of the clutter and signals, they would be expected to have reduced performance. The performance equations derived herein enable the comparisons of practical detectors against the optimum and matched filter detectors.

For the mismatched detector, $R_{ID}^{q'}$ is the design interference correlation matrix that has been estimated, and $R_{IA}^{q'}$ is the actual interference correlation matrix. The output $z_t$ due the target 150 of the mismatched detector is given by:

$$z_t = a_r b_q \alpha \delta_k^H (\tilde{S}_d^{q'})^H (R_{ID}^{q'})^{-1} \tilde{S}_d^{q'} \delta_k. \quad (54)$$

This provides the power output of the mismatched detector due to the target as:

$$|z_t|^2 = |\alpha|^2 |\delta_k^H (\tilde{S}_d^{q'})^H (R_{ID}^{q'})^{-1} \tilde{S}_d^{q'} \delta_k|^2. \quad (55)$$

The response of the mismatched detector due to interference is:

$$z_t = \delta_k^H (\tilde{S}_d^{q'})^H (R_{ID}^{q'})^{-1} y_I. \quad (56)$$

The expected value of the target power exiting the mismatched filter is:

$$E\{|z_t|^2\} = \delta_k^H (\tilde{S}_d^{q'})^H (R_{ID}^{q'})^{-1} E\{y_I y_I^H\} (R_{ID}^{q'})^{-1} \tilde{S}_d^{q'} \delta_k \quad (57)$$
$$= \delta_k^H (\tilde{S}_d^{q'})^H (R_{ID}^{q'})^{-1} R_{IA}^{q'} (R_{ID}^{q'})^{-1} \tilde{S}_d^{q'} \delta_k.$$

From eqns. (55) and (57), the SIR for the single pulse mismatched detector is determined as:

$$SIR = \frac{|z_t|^2}{E\{|z_t|^2\}} = |\alpha|^2 \frac{|\delta_k^H (\tilde{S}_d^{q'})^H (R_{ID}^{q'})^{-1} \tilde{S}_d^{q'} \delta_k|^2}{\delta_k^H (\tilde{S}_d^{q'})^H (R_{ID}^{q'})^{-1} R_{IA}^{q'} (R_{ID}^{q'})^{-1} \tilde{S}_d^{q'} \delta_k}. \quad (58)$$

The SIR for the multiple pulse mismatched detector is:

$$SIR = |\alpha|^2 \frac{\begin{bmatrix} u_0 \tilde{S}_d^{q'}(0)\delta_t \\ \vdots \\ u_{M-1} \tilde{S}_d^{q'}(M-1)\delta_t \end{bmatrix}^H (R_{ID}^{q'})^{-1} \begin{bmatrix} u_0 \tilde{S}_d^{q'}(0)\delta_t \\ \vdots \\ u_{M-1} \tilde{S}_d^{q'}(M-1)\delta_t \end{bmatrix}}{\begin{bmatrix} u_0 \tilde{S}_d^{q'}(0)\delta_t \\ \vdots \\ u_{M-1} \tilde{S}_d^{q'}(M-1)\delta_t \end{bmatrix}^H (R_{ID}^{q'})^{-1} R_{IA}^{q'} (R_{ID}^{q'})^{-1} \begin{bmatrix} u_0 \tilde{S}_d^{q'}(0)\delta_t \\ \vdots \\ u_{M-1} \tilde{S}_d^{q'}(M-1)\delta_t \end{bmatrix}}. \quad (59)$$

In summary, the SIR for single pulse matched, multiple pulse matched, single pulse mismatched and multiple pulse mismatched can be expressed as respective eqns. (48), (53), (58) and (59).

Section 4—Parameter Estimation: To apply the optimum detectors previously developed requires knowledge of the target amplitude and phase. In this section parameter estimation will be addressed. The most straight forward method to gain estimates of parameters required for the optimum detector involves using standard matched filter processing to estimate $\alpha$ and $b^q$. Once this is accomplished, these estimates can be applied to eqns. (11) or (29) to be used in the eqns. (30) or (31).

To illustrate this, consider the example of a single transmitter 120 and single pulse. The estimator for the q' receiver channel would be:

$$\hat{\alpha}^{q'} \hat{b}^{q'} = \frac{(s^{q'})^H y}{(s^{q'})^H s^{q'}}, \quad (60)$$

where $s^{q'}$ is the vector of the baseband signal q' that was transmitted, and y is the received vector in the $r^{th}$ receiver. This is a simplified representation of the matched filter.

Next, one can show that eqn. (60) is an unbiased estimator of $\alpha$ and $b^{q'}$. According to the signal and interference model (and ignoring clutter) one has:

$$\hat{\alpha}^{q'} \hat{b}^{q'} = \frac{(s^{q'})^H (\alpha b^{q'} s^{q'} + n)}{(s^{q'})^H s^{q'}}, \quad (61)$$

where n is the vector of AWGN. Taking the expectation, one obtains:

$$E\{\hat{\alpha}^{q'} \hat{b}^{q'}\} = \alpha b^{q'} \frac{(s^{q'})^H s}{(s^{q'})^H s^{q'}} + E\left\{\frac{(s^{q'})^H n}{(s^{q'})^H s^{q'}}\right\} = \alpha b^{q'}, \quad (62)$$

noting that AGWN vector n is zero mean.

Unfortunately, in the MIMO context where there are multiple simultaneous signals, the matched filter estimates of $\alpha^{q'}$ and $b^{q'}$ are contaminated by the other transmit signals. This can be shown by including them in the signal and interference models. Including the other signals in eqn. (61) produces:

$$\hat{\alpha}^{q'} \hat{b}^{q'} = \frac{(s^{q'})^H (\alpha b^{q'} s^{q'} + n)}{(s^{q'})^H s^{q'}} + \frac{\sum_{q \neq q'} (s^{q'})^H s^q \alpha b^q}{(s^{q'})^H s^{q'}}. \quad (63)$$

Taking the expectation of eqn. (63) provides the mean output of the matched filter estimator of:

$$E\{\hat{\alpha}^{q'} \hat{b}^{q'}\} = \alpha b^{q'} \frac{(s^{q'})^H s}{(s^{q'})^H s^{q'}} + E\left\{\frac{(s^{q'})^H n}{(s^{q'})^H s^{q'}}\right\} + \frac{\sum_{q \neq q'} (s^{q'})^H s^q \alpha b^q}{(s^{q'})^H s^{q'}} \quad (64)$$
$$= \alpha b^{q'} + \frac{\sum_{q \neq q'} (s^{q'})^H s^q \alpha b^q}{(s^{q'})^H s^{q'}},$$

where the last term biases the estimates $\alpha$ and $b^{q'}$. Therefore, the signal cross-talk limits the accuracy of the matched filter estimator. The estimates for of a and $b^{q'}$ can be applied to the optimum detectors enabling an improved detection and measurement of the signal returns. Performance results will be presented subsequently.

The objective is to improve the signal parameter estimation. Because the optimum detector produces a higher SIR eqn. (59) than the matched filter eqn. (53), one expects to obtain an improved estimate of the signal parameters using that detector. This can be accomplished by using the matched filter estimate of eqn. (60) to estimate interference correlation $R_I^{q'}$ for each transmit signal and form the optimum filter for each transmit signal.

Applying the optimum detector formed this manner provides the estimate of the target amplitude and phase:

$$\hat{a}^{q'}\hat{b}^{q'} = \frac{\delta_k^H(\tilde{S}_d^{q'})^H \hat{R}_I^{q'} y}{\delta_k^H(\tilde{S}_d^{q'})^H \hat{R}_I^{q'} \tilde{S}_d^{q'} \delta_k}, \quad (65)$$

where $\hat{R}_I^{q'}$ represents the estimate of the interference matrix for the $q'^{th}$ transmit signal. One can subsequently explain that this updated estimate does indeed produce an improved estimate over the matched filter based estimator. The updated parameter estimates gained from applying eqn. (65) are applied to the next estimate of interference correlation $R_I^{q'}$.

Section 5—Mitigation of Signal Cross-Talk: In § 4, the techniques to estimate amplitude and phase of the transmit signals was provided. The matched filter was also shown to provide an unbiased estimate when there is only one signal. Unfortunately, in the MIMO context, the matched filter produces a biased estimate, because the other transmit signals contributes to the estimated amplitude and phase.

The optimum detector produces the highest signal to interference ratio of all filters. Therefore, one can expect that estimates of amplitude and phase would be much improved at high signal-to-noise ratio (SNR). However, to form these detectors, one needs to know the amplitude and phase of the signals, which constitutes the very information to be estimated.

Figure 2:
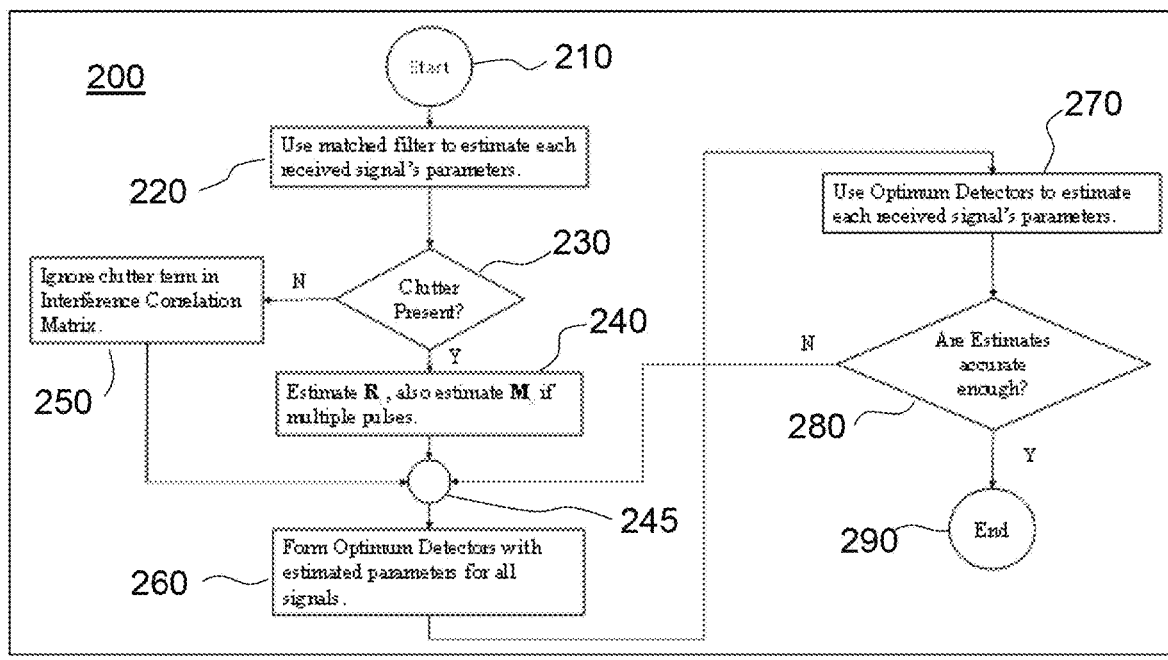
FIG. 2 is a flowchart diagram view of signal detector optimization.

One can propose an approach to incorporate the matched filters and optimum detectors formed with estimated signal parameters to produce greatly improved estimates of amplitude and phase. One can also show the effect of signal cross-talk and the improvements possible with this approach. FIG. 2 shows a flowchart view 200 for the exemplary signal cross-talk mitigation technique.

The process begins at start 210 and proceeds to a first operation 220 to estimate each received signal parameter via matched filter. This leads to a first query 230 for the presence of clutter. If so, then a second operation 240 estimates clutter correlation $R_{Y_c}$ from eqn. (19) and for clutter time correlation matrix $M_c$ from eqn. (23) as well, proceeding to a link node 245. Otherwise, then a third operation 250 as the alternative ignores clutter in an interference correlation matrix $R_I^{q'}$, before proceeding to the node 245.

From this, the process proceeds to a fourth operation 260 to form optimum detectors with estimated parameters for all signals. Parameters represent signal characteristics, such as output power $z_t^2$ from the target 150. This precedes continuing to a fifth operation 270 to estimate each received signal parameter via optimum detectors. This leads to a second query 280 for whether estimates are sufficiently accurate (i.e., within some predetermined tolerance). If yes, then the process terminates at the end 290. Otherwise if no, the process returns to the node 245.

Referencing view 200, one begins by forming matched filters for all the received signals. Use of the matched filters' output enables one to estimate the amplitude and phase of a given signal in operation 220 as provided in eqn. (60) for the single pulse case. Next, determine whether clutter is present in query 230. If so, one can estimate the clutter parameters in operation 240 to apply to the optimum detectors (see application Ser. No. 18/071,774). Having the parameters necessary to form the optimum detectors in operation 260 as shown for the single pulse case in eqn. (30), and the multiple pulse case in eqn. (31).

Using the optimum detector estimate from operation 260, the signal parameters can be used for the single pulse case as indicated in eqn. (65). Next one can determine in query 280 whether the estimates are sufficiently accurate. If so, one can use the estimates just obtained. If not, form the optimum detectors with the latest signal parameter estimates in operation 260 and estimate signal parameters again. One iteratively repeats this cycle until the estimates are sufficiently accurate.

The performance of this technique is demonstrated for the case of four time aligned single pulse signals with no clutter present as in operation 250. This enables for direct comparisons of the normal matched filter processing versus the proposed technique without the cofounding factors of clutter and Doppler processing. To compare the matched filter's performance to the exemplary technique, the output SIRs will be compared followed by a comparison of the phase measurement errors.

To illustrate the effect of signal cross talk three cases (labeled I, II and III) will be analyzed. Each case consists of four transmit signals. The four transmit signals have a bandwidth of 2.5 MHz and have their carrier frequencies spaced by 0 Hz, 1.25 MHz or 5 MHz. The signals are up chirp, down chirp, up-down chirp and down-up chirp. Based on the signals' modulation, they are partially decorrelated or orthogonal. With the different frequency spacing the correlation varies.

FIG. 3A shows a graphical view 300 of a pulse spectrum plot for Case I as an overlapping spectrum that includes the four signals with 0 Hz spacing. Frequency 310 (MHz) denotes the abscissa, while amplitude 320 (dB) presents the ordinate. A legend 330 distinguishes signals S1 as trace 340, S2 as trace 350, S3 as trace 360 and S4 as trace 370. Note that traces 340 and 360 are obscured. Both traces 350 and 370 show an amplitude peak near 0 MHz. FIG. 3B shows a tabular view 380 as Table I that presents the signal parameters. The pulse width for each is 11.25 µs and the modulation of the chirp signals are sequentially down/up, up/down, up and down, respectively. FIG. 3C shows a tabular view 390 as Table II gives the correlation of the signals with the 0 Hz spacing indicating that the signals are somewhat decorrelated, with values between −8.4 dB and −13.4 dB.

FIG. 4A shows a graphical view 400 of the spectrum of Case that has the signals main spectrum response separated in frequency by either ±1.25 MHz or ±2.75 MHz. Frequency 410 (MHz) denotes the abscissa, while amplitude 420 (dB) presents the ordinate. A legend 430 distinguishes signals $s^1$ as trace 440, $s^2$ as trace 450, $s^3$ as trace 460 and $s^4$ as trace 470.

FIG. 4B shows a tabular view 480 as Table III that presents the signal parameters. The pulse width for each is 11.25 µs and the modulation of the chirp signals are sequentially down/up at 2.75 MHz, up/down at 1.25 MHz, up at −1.25 MHz and down at −2.75 MHz, respectively. FIG. 4C shows a tabular view 490 as Table IV gives the correlation of the signals with the bilaterally symmetric spacing indicating that the signals are somewhat decorrelated, with values between −11.3 dB and −25.1 dB. Because of the different modulation and frequency separation the correlation of these signals is reduced, as seen in tabular view 490. However, this is still some correlation between the signals that one can show has an effect on SIR and measurement accuracy.

FIG. 5A shows a graphical view 500 of the spectrum of Case III that has the signals main spectrum response with separation of 10 MHz spacing. Frequency 510 (MHz) denotes the abscissa, while amplitude 520 (dB) presents the ordinate. A legend 530 distinguishes signals $s^1$ as trace 540, $s^2$ as trace 550, $s^3$ as trace 560 and $s^4$ as trace 570. FIG. 5B shows a tabular view 580 as Table V that presents the signal parameters. The pulse width for each is 11.25 μs and the modulation of the chirp signals are sequentially down/up at 5 MHz, up/down at 10 MHz, up at −5 MHz and down at −10 MHz, respectively.

FIG. 5C shows a tabular view 590 as Table VI gives the correlation of the signals with the bilaterally symmetric spacing indicating that the signals are somewhat decorrelated, with values between −24.4 dB and −36.6 dB. With this maximal separation, the correlation properties are improved as seen view 590. Even though the correlation is much less, these signals are not perfectly decorrelated and will experience some cross talk.

FIG. 6 shows a graphical view 600 of Output SIR versus input SNR for fixed phase angles for Case I. Input signal-to-noise ratio (SNR) 610 denotes the abscissa, while output SIR 620 provides the ordinate. A legend 630 identifies the optimum detection 640 and matched filter 650 as traces as well as optimum detection with expected error 660 as points. The effect of cross-talk can be quantified by the SIR 620.

From view 600, one can observe that the SIR 620 of the matched filter trace 650 reaches a maximum of about 18 dB. This is because as the signals become much larger than the noise, they begin to interfere with each other and limit measurement accuracy. The optimum detector 640, on the other hand, increases SIR 620 as SNR 610 improves. This shows that the optimum detector 640 can reject the cross-talk of the other signals. Unfortunately, this is theoretical performance because the signal parameters must be known ahead of time to form the detector.

However, using the exemplary technique, one can incorporate the matched filter 650 to produce estimated signal parameters. Even though these parameters are corrupted by signal cross-talk, when they are applied to the optimum detector 660 they improve the output SIR 620. This is demonstrated in graphical view 600 of the optimum filter 640 using the expected values of signal parameters for the matched filter 650. Thus, applying imperfect estimates to the optimum detector improves measurement performance, mitigating cross-talk.

To better quantify the potential performance improvement, a Monte Carlo simulation was run to show the improvement in angle measurement error. Angle accuracy is generally more important than amplitude accuracy in radar applications. The Monte Carlo simulation varied noise realizations and signal phase angles for each trial. To produce stable statistics, there were four-hundred trials run.

FIG. 7 shows a graphical view 700 of Phase angle errors for Case I with the root mean squared (RMS) error of the phase angle measurements for four-hundred trials. Input SNR 710 (dB) denotes the abscissa, while RMS phase angle 720 (radians) presents the ordinate. A legend 730 identifies matched filter 740, optimum detector with estimate 750, second pass optimum detection 760 and third pass optimum detection 770, all shown as points.

The experiment was repeated for input SNRs −9 dB, 1 dB, 11 dB, 21 dB, and 31 dB. The matched filter estimate error 740 is about 0.1 radians as stars for all SNRs, meaning that cross-talk is dominating the error. Further an RMS error of 0.1 radian or 5.7° is large. However, applying flowchart in view 200 shows that the errors are driven smaller on each iteration. First, using the output of the matched filter 740 to estimate signal parameters and applying them to the optimum detector 750 as plus-signs reduces the error significantly. The second pass estimate 760 as circles uses the signal parameters estimated with the optimum detector, thus refining them. The third pass 770 as crosses iterates the process one more time. The second and third passes 760 and 770 provide substantially the same results.

FIG. 8 shows a graphical view 800 of a rescaled plot for the phase angle errors for Case I. Input SNR 810 (dB) denotes the abscissa, while RMS phase angle 820 (radians) presents the ordinate (and identical to angle 720). A legend 830 identifies for optimum detector with estimate 840 as plus signs, second pass optimum detection 850 as crosses and third pass optimum detection 860 as stars, all shown as points (corresponding to detection points 750, 760, 770). The experiment was repeated for input SNRs 810 as −9 dB, 1 dB, 11 dB, 21 dB, and 31 dB. The phase angle errors are shown eliminating the matched filter results 740.

This enables the ordinate 820 to be rescaled, better illustrating the improvements obtained with successive iterations. Here one can observe that there are improvements made in every iteration. The third iteration 850 at input SNR of 31 dB produces an RMS phase error of 0.15 milliradian error or an improvement of six-hundred-fifty to one over the matched filter phase error.

FIG. 9 shows a graphical view 900 of the output SIR as a function of input SNR for Case II, also featuring improvements from the exemplary technique. Input SNR 910 (dB) denotes the abscissa, while output SIR 920 provides the ordinate. A legend 930 identifies optimum detector 940, matched filter 950 as traces as well as optimum detection with estimate 960 as points. Here the output SIR 920 of the matched filter 950 is limited to about 23 dB. By applying the signal parameter estimates from the matched filter 950 to the optimum detector 940 produces an output SIR limit of about 44 dB as estimates 960. Both the matched filter 950 and the optimum detector using estimated parameters 960 for Case II perform better than Case I. This is due to the improved correlation properties in view 490 (Table IV) of Case II compared to Case I in view 390 (Table II).

FIG. 10 shows a graphical view 1000 of the RMS phase errors for Case II. Input SNR 710 (dB) denotes the abscissa, while RMS phase angle 720 (radians) presents the ordinate. A legend 1030 identifies matched filter 1040, optimum detector with estimate 1050, second pass optimum detection 1060 and third pass optimum detection 1070, all shown as points. As can be observed, the matched filter 1040 produces an RMS of about 0.048 radian (2.8°). This improvement over Case I is due to the less cross-talk of Case II. The exemplary technique still shows significant improvement for every iteration. For the third pass iteration 1070, the RMS error at 31 dB input SNR is 46 microradians. This is an improvement of phase error by three orders of magnitude (about a thousand-to-one) with three iterations.

The final case to be considered is Case III. This case has the four signals well separated in frequency giving them significantly better correlation properties. FIG. 11 shows a graphical view 1100 of the output SIR versus input SNR for Case III, also featuring improvements from the exemplary technique. Input SNR 1110 (dB) denotes the abscissa, while output SIR 1120 provides the ordinate. A legend 1130 identifies optimum detector 1140, matched filter 1150 as traces as well as optimum detection with estimate 1160 as points. Here for Case III, the output SIR 1120 of the matched filter 1150 is limited to about 45 dB. This is due to the improved correlation properties in view 590 (Table VI) of Case III compared to Case II in view 490 (Table IV).

FIG. 12 shows a graphical view 1200 of RMS phase angle errors for Case III. Input SNR 1210 (dB) denotes the abscissa, while RMS phase angle 1220 (radians) presents the ordinate. A legend 1230 identifies matched filter 1240, optimum detector with estimate 1250, second pass optimum detection 1260 and third pass optimum detection 1270, all shown as points. For the matched filter 1240 as stars, the output SIR 1120 is limited to about 46 dB as trace 1150. The detector points as plus signs 1250, circles 1260 and crosses 1270 substantially superimpose each other. When the matched filter 1240 is used to estimate the signal parameters for the optimum detector 1250, near theoretical performance is achieved as star points 1160.

The matched filter 1240 based phase estimation error is limited to about 3.5 milliradian (about 0.2°). Applying the exemplary technique produces reduced RMS phase errors for every iteration. However, most of the improvement occurs with the first iteration. The RMS phase angle error at 31 dB input SNR is 41 microradians as crosses 1270. This provides an improvement of over eighty-five to one. As expected for Case III, the matched filters 1240 performance is much better because there is much less cross-talk.

The exemplary technique here overcomes the lack of perfect orthogonality (or uncorrelatedness) of waveforms for MIMO radar 110. With this approach, one can reduce cross-talk interference and improve measurement accuracy. Because radio frequency (RF) spectrum is a scare resource, this approach allows the radar designer to decrease the RF spectrum requirements yet still achieve desired performance.

Possible radar applications also include MIMO interferometer as provided by Jeff Holder, *Angle-of-Arrival Estimation Using Radar Interferometry: Methods and Applications*, The Institution of Engineering and Technology, Edison, NJ, 2014, where in § 6.3, applying this technique will improve target angle measurement accuracy. In other applications where MIMO processing is used to form beams (see Davis), increased amplitude and phase accuracy will improve the beamforming performance. This will specifically improve antenna pattern sidelobes, enabling better rejection for large sidelobe targets.

In conclusion, this technique will function in any situation where signals may interfere with each other. All that is required is a knowledge of their time offsets, modulation, frequency, amplitude, and phase. In cases where these parameters are unknown, they can be estimated through the matched filters. Once they are obtained the signal parameters can be applied and whitening matched filters who cancel the cross-talk. These estimates can be improved through successive iterations of this exemplary process as in flowchart view 200.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented signal process method for identifying a target amid clutter and minimize cross-talk from a plurality of receive signals returned therefrom via a Multiple Input Multiple Output (MIMO) radar system that emits a plurality of transmit signals into a resolution cell that contains said target and said clutter, said method comprising:

employing a match filter to estimate a target set of parameters from each receive signal of the plurality of receive signals;

determining interference correlation $R_I^{q'}$ for q' receive antenna of the MIMO radar system;

estimating receiver response clutter correlation $R_{Y_c}$ as an estimated correlation;

forming an optimum detector with said estimated correlation for said each receive signal among the plurality of receive signals;

employing said optimum detector to estimate said target set of parameters from said each receive signal as an estimated target parameter;

returning to said forming operation in response to said estimated target parameter exceeding an established tolerance;

applying said estimated target parameter to the plurality of receive signals; and submitting said plurality of receive signals to the MIMO radar system.

2. The method according to claim 1, wherein said set of parameters is output power.

3. The method according to claim 1, further including estimating clutter time correlation $M_c$ for a plurality of pulses among the plurality of transmit signals.

4. The method according to claim 1, wherein said estimating clutter operation includes a convolution matrix $\tilde{S}^{q'}$.

5. The method according to claim 1, wherein said interference correlation is determined by $$R_I^{q'} = \sum_{q=1}^{Q} \tilde{S}^q R_c (\tilde{S}^q)^H + |\alpha|^2 \sum_{q \neq q'} \sum_{\lambda \neq q'} b_q b_\lambda^* \tilde{S}_d^q(m) \delta_k \delta_k^H \left( \tilde{S}_d^\lambda(m) \right)^H + \sigma_n^2 I$$

with $R_c$ being a clutter correlation matrix as $R_c =$ $$R_c = \begin{bmatrix} \sigma_1^2 & & 0 \\ & \ddots & \\ 0 & & \sigma_{P+2(N-1)}^2 \end{bmatrix}$$

with $\sigma_i^2$ as clutter power variance at range cell i, b denoting coefficients and $\delta_k$ being a target vector; and said receive response clutter correlation $R_{Y_c}$ is determined by $$R_{Y_c} = \sum_{q=1}^{Q} \begin{bmatrix} \rho_{1,1} \tilde{S}^q R_c (\tilde{S}^q)^H & \cdots & \rho_{1,1} \tilde{S}^q R_c (\tilde{S}^q)^H \\ \vdots & \ddots & \vdots \\ \rho_{M,1} \tilde{S}^q R_c (\tilde{S}^q)^H & \cdots & \rho_{M,M} \tilde{S}^q R_c (\tilde{S}^q)^H \end{bmatrix} = \sum_{q=1}^{Q} M_c \otimes \tilde{S}^q R_c (\tilde{S}^q)^H,$$

with $M_c$ being clutter time correlation.

6. The method according to claim 3, wherein said clutter time correlation $M_c$ is determined as $M_c=$ $$M_c = \begin{bmatrix} \rho_{1,1} & & \rho_{1,M} \\ & \ddots & \\ \rho_{M,1} & & \rho_{M,M} \end{bmatrix},$$

and M is pulse quantity.

7. The method according to claim 4, wherein said convolution matrix $\tilde{S}^{q'}$ for a signal from said q' antenna has size $(P+N-1)\times(P+2(N-1))$ such that P denotes uneclipsed sample quantity in a received interval and is determined by $\tilde{S}^{q'}=$ $$\tilde{S}^{q'} = \begin{bmatrix} 0 & \cdots & 0 & (s^{q'})^t \\ 0 & \cdots & (s^{q'})^t & 0 \\ & \ddots & & \\ (s^{q'})^t & 0 & \cdots & 0 \end{bmatrix},$$

where $s^{q'}$ is the vector of baseband samples of $s^{q'}(t)$ of length N, and superscript t indicates transpose.

* * * * *